May 13, 1969  R. W. GOODE  3,443,840
BRAKE CONTROL FOR CABLE-TENSIONING APPARATUS
Filed July 24, 1967
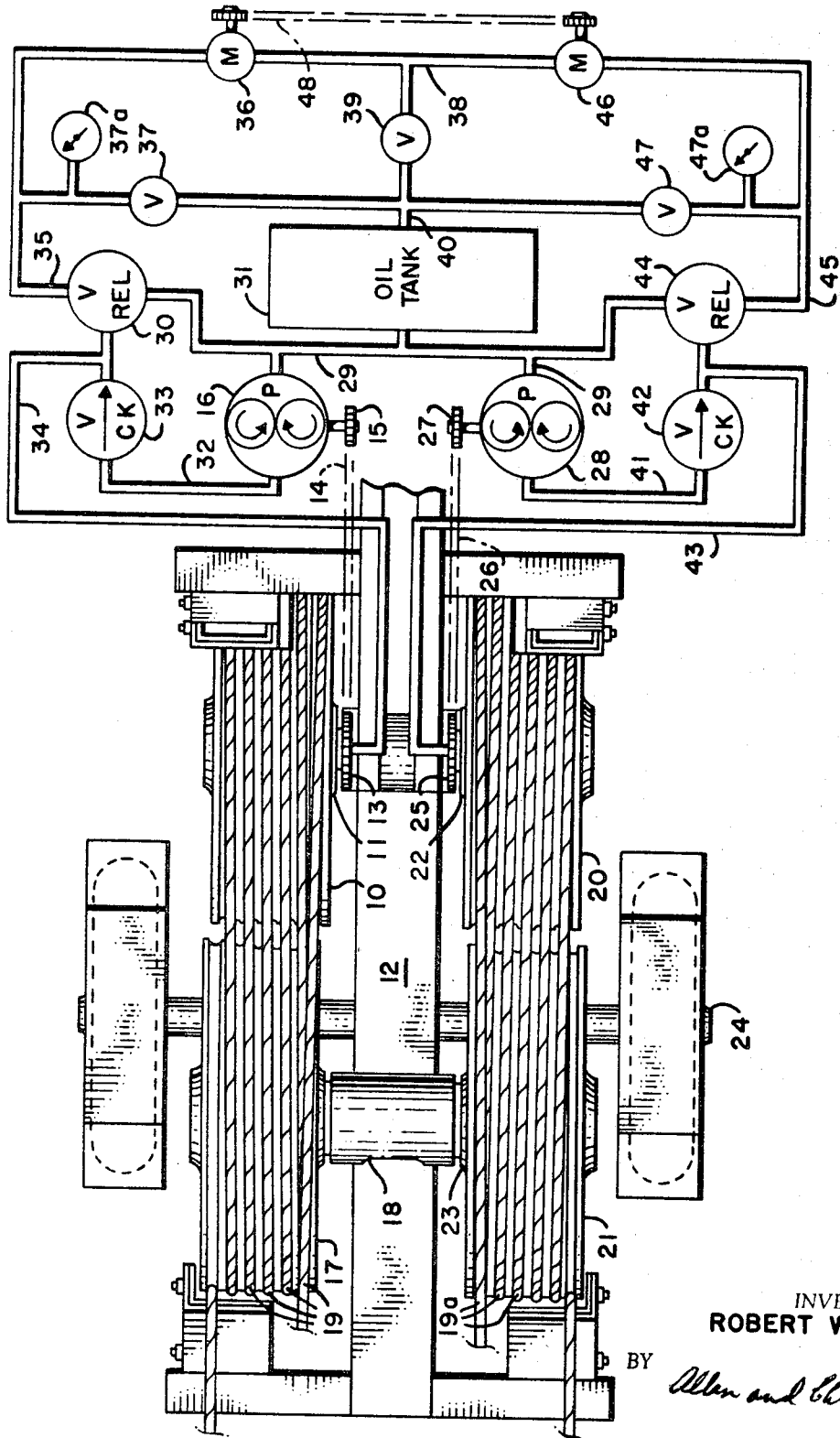
INVENTOR.
ROBERT W. GOODE
BY
ATTORNEYS United States Patent Office
3,443,840
Patented May 13, 1969

3,443,840
BRAKE CONTROL FOR CABLE-
TENSIONING APPARATUS
Robert W. Goode, Rte. 1, Box 112A,
Morgan Hill, Calif. 95037
Filed July 24, 1967, Ser. No. 655,540
Int. Cl. B60t 13/18, 13/74
U.S. Cl. 303—11          6 Claims

ABSTRACT OF THE DISCLOSURE

A cable tensioning system provided with two or more sets of brakes, each set of brakes being associated with a set of bull wheels, and each set of bull wheels drives a fixed displacement pump which furnishes hydraulic pressure to the brakes associated with the driving wheels and also discharges to a fixed displacement hydraulic motor. A motor is associated with each set of bull wheels and all motors are of matched displacement. The motors are connected by mechanical means so that if one motor is driven by hydraulic pressure it drives the other motors which, in turn, reduce the fluid pressure on the bull wheel brakes associated therewith. The hydraulic lines from all of the motors are also connected together and through a main control valve to the oil supply tank. The hydraulic lines between each pump and motor are connected to an auxiliary control valve.

This invention relates to a brake control system for cable tensioning apparatus.

An object of this invention is to provide an improved brake control system for cable tensioning apparatus.

Another object of this invention is to provide an improved brake control system for loads such as bull wheels of cable tensioning apparatus in which it is desired to synchronize or control two or more sets of brakes.

Another object of this invention is to provide an improved brake control system for loads such as bull wheels of cable tensioning apparatus which is provided with a hydraulic control which may be regulated so that it is possible to pay out more cable from one bull wheel than is paid out from another bull wheel of the tensioning apparatus.

Still another object of this invention is to provide a control system for cable tensioning apparatus which employs several pairs of bull wheels, the control system being provided with a manual adjustment whereby it is possible to pay out cable from only one pair of bull wheels while the other pair of bull wheels is held stationary.

Still another object of this invention is to provide a control system for cable tensioning apparatus which employs several pairs of bull wheels for paying out cables, the control system being provided with pumps which are adapted to be driven by the respective pairs of bull wheels to provide hydraulic pressure to the brakes of the associated bull wheels, the hydraulic systems of the respective bull wheels each being provided with an hydraulic motor and all of the hydraulic motors being mechanically interconnected so that when one motor is driven it functions to drive the other motors which may not be driven from their respective hydraulic systems, the pumps and motors having predetermined displacements so that predetermined speed ratios may be maintained between the rotations of the respective bull wheels.

Still another object of this invention is to provide an improved brake control system for two or more sets of brakes, each of which is associated with a set of wheels which are loaded and which the load tends to rotate, said brakes being controlled by hydraulic pressure which is related to the speed of rotation of the wheel associated with the brake and the hydraulic systems of the various wheels being interconnected so that a balance may be established between the speeds of rotation of the different wheels.

Another object of this invention is to provide an improved brake control system in which a separate brake is associated with each of a plurality of loaded wheels which the loads thereof tend to rotate, the brakes being controlled by hydraulic pressure which is developed by one or more of the wheels during rotation thereof.

Another object of this invention is to provide an improved brake control system for two or more loads in which it is desired to maintain relatively equal speeds, each load drives a fixed displacement pump which is connected to a fixed displacement hydraulic motor and to the brakes associated with the driving load, the motors associated with the different loads being connected by mechanical means so that if a certain one of the motors is driven through the operation of the load associated therewith, all of the motors are driven through the mechanical connection with the result that the loads associated with the driven motors are released by the brakes thereof since the pressures or fluid volumes of the brake systems on the latter loads drop through the operation of the driven motors, and as a late released load operates, the pump associated therewith is driven and the pressure or fluid volume in the brake system thereof builds up to balance with the pressure in the brake system of the first load.

Other and further objects of this invention will be apparent to those skilled in the art to which it relates from the following specification, claims and drawing, in which, briefly:

The sole figure of the drawing illustrates a preferred embodiment of this invention controlling two sets of bull wheels.

Referring to the drawing in detail, reference numeral 10 designates a bull wheel which is provided with a brake arrangement such as shown in my copending application Serial No. 644,916 filed on June 9, 1967. While specific reference is made to the brake arrangements shown in my copending application, it is, of course, to be understood that this control system may be employed with any hydraulically operated brake arrangement which may be of conventional construction. Bull wheel 10 is mounted on a shaft 11 which is supported by the frame 12. A sprocket 13 is fixedly attached to the wheel 10 and rotates when the bull wheel 10 is rotated. A chain 14 is provided between the sprocket 13 and the sprocket 15 of the fixed displacement pump 16. Thus, the pump 16 is driven when the bull wheel 10 is rotated.

Another bull wheel 17 is mounted on the shaft 18 adjacent to bull wheel 10 and is also supported by the frame 12. The cable 19, which is to be maintained under predetermined tension, is wound around bull wheels 10 and 17.

A second pair of bull wheels 20 and 21, which are supported by shafts 22 and 23, respectively, on the frame 12 is shown in the drawing, and this second pair of bull wheels is similar to the first pair of bull wheels 10 and 17. Bull wheel 20 is also provided with a conventional brake arrangement or one such as shown in my copending application Ser. No. 644,916. A sprocket 25 is attached to the wheel 20 so that this sprocket is rotatable therewith and drives the sprocket wheel 27 through the chain 26. Sprocket 27 is mounted on the shaft of the fixed displacement pump 28 which is similar to the pump 16. Pumps 16 and 28 are of conventional construction and they may be of matched displacement.

Pump 16 is connected by fluid line 29 to the relief valve 20 and to the oil tank 31 and by fluid line 32 to check valve 33. Check valve 33 and relief valve 30 are connected by fluid line 34 to the hydraulicly operated brake arrangement of bull wheel 10. Fluid line 35 is provided between the relief valve 30 and the fixed displacement motor 36 and to the auxiliary control valve 37. A pressure gauge 37a is also connected to indicate the pressure in line 35. The hydraulic line 38 from motor 36 is connected to the main control valve 39 which is connected by line 40 to the auxiliary control valve 37 and to the oil tank 31.

The hydraulic line 29 from oil tank 31 is also connected to the fixed displacement pump 28 which is driven by sprocket 27, chin 26 and sprocket 25 associated with the other bull wheel 20. Fluid pressure from pump 28 is supplied through line 41 and check valve 42 to the brake pressure line 43 which is connected to the hydraulically operated brake arrangement of bull wheel 20. Hydraulic line 43 is also connected to the pressure relief valve 44 which is connected by hydraulic line 45 to the fixed displacement motor 46 and to the auxiliary control valve 47. Pressure gauge 47a is also connected to line 45 to indicate the pressure therein. Motor 46 is connected by hydraulic line 38 to the main control valve 39 which is connected by hydraulic line 40 to the oil tank 31, as previously described. Auxiliary control valve 47 is also connected to hydraulic line 40 which leads to the oil tank 31.

While the pumps 16 and 28 have been referred to as fixed displacement pumps of matched displacement this is required only when it is desired to maintain substantially the same speeds of rotation of the bull wheels 10 and 20, respectively. Substantially the same speeds of rotation of these wheels may be maintained when the displacements of the pumps 16 and 28 are matched and when the displacements of the motors 36 and 46 are also matched. On the other hand, if the displacements of the motors 36 and 46 are matched and pump 16 has twice the volume of pump 28, then bull wheel 10 will rotate half as fast as bull wheel 20. The displacements of the motors 36 and 46 also need not be matched. Different speeds of rotation of bull wheels 10 and 20 may be obtained by providing motors 36 and 46 of different displacements when pumps 16 and 28 are either of the same displacement or of different displacements. Furthermore, pumps 16 and 28 and motors 36 and 46 may be of variable displacement types so that the speeds of rotation of bull wheels 10 and 20 may be varied or controlled as desired by varying these displacements.

The operation of this apparatus is as follows. If it is assumed that the bull wheels 10 and 17 start to turn because of the pull exerted thereon by cable 19, the pump 16, which is driven by the wheel 10, provides hydraulic pressure on the motor 36 through line 32, check valve 33, line 34, relief valve 30 and line 35, since auxiliary control valve 37 is closed. This pressure is controlled by the main control valve 39 which is connected between the motor 36 and oil tank 31 by lines 38 and 40. As bull wheels 10 and 17 turn and pump 16 is driven, motor 36 is driven by the pressure supplied thereto. Motor 36 is mechanically connected to motor 46 by the chain or shaft connection 48. Motor 46 is thus driven, and the pressure in the brake line 43 of bull wheel 20 is reduced since motor 46 is driven as a pump by motor 36 through connection 48. The load provided by the cable 19a on bull wheels 20 and 21 causes them to revolve and drive pump 28. As these wheels revolve, the pressure in brake line 43 builds up through the operation of the pump 28 which is driven by bull wheel 20. Pressure in line 43 builds up to balance with the pressure in line 34 leading to the brake of bull wheel 10. These pressures are of course relative to the speeds of these wheels and a balance is established as these speeds are equalized. The balance in speed, however, is not dependent upon a fixed brake system pressure. One of the set of bull wheels may be allowed to operate faster than the other set or sets by opening one of the auxiliary valves 37 or 47, depending upon which set of wheels is to be allowed to operate faster than the other. Also, bull wheels 10 and 17 may be allowed to operate while wheels 20 and 21 are stationary simply by opening auxiliary valve 37 and closing valves 39 and 47, or, on the other hand, wheels 20 and 21 may be allowed to operate while wheels 10 and 17 are stationary simply by opening auxiliary valve 47 and closing valves 37 and 39.

This system allows complete control of the brakes in wheels 10 and 20 so that the sets of wheels 10–17 and 20–21 may be allowed to operate in synchronism or be adjused during the operation so that each set operates indepedently of the other set, as described.

While this invention has been shown in connection with two pairs of bull wheels 10–17 and 20–21, it may be employed with additional pairs of bull wheels, each of which is provided with a hydraulic brake control system such as shown and described. Each of these brake control systems employs a pump and motor and the hydraulic motors associated with the additional bull wheels are mechanically coupled so that all of the motors are connected by means such as the link 48 shown in the drawing. Also, the oil tank 31 is connected to the brake systems of the additional pairs of bull wheels by connecting the hydraulic line 29 to the pumps thereof and by connecting the hydraulic line 38 to the motor thereof. Thus, this brake control system may be used with three, four, five or more pairs of bull wheels if desired by making the above described hydraulic connections, and also by linking the motors mechanically.

What I claim is:

1. In a brake control system for use with several loaded members, the combination of a first hydraulic brake associated with a first load and a first means associated with said first load supplying fluid pressure to said first brake controlling said first load, a second hydraulic brake associated with a second load and a second means associated with said second load supplying fluid pressure to said second brake controlling said second load, a first hydraulic motor associated with said first load, a second hydraulic motor associated with said second load, hydraulic means connecting said first motor to said first fluid pressure supplying means and hydraulic means connecting said second motor to said second fluid pressure supplying means, means mechanically connecting said motors together so that a driven one of said motors drives the other of said motors and causes it to control the fluid pressure on the hydraulic brake associated therewith.

2. In a brake control system for use with several loaded members, the combination as set forth in claim 1 further characterized in that said first and said second fluid pressure supplying means comprises a first and a second pump and means driving said first pump from said first load and said second pump from said second load.

3. In a brake control system for use with several loaded members, the combination as set forth in claim 2 further characterized in that said first pump and said first motor are of predetermined related displacements and said second pump and said second motor are also of predetermined related displacements.

4. In a brake control system for use with several loaded members, the combination as set forth in claim 3 further characterized in that there is provided a main control valve connected to control said motors and an auxiliary control valve connected to bypass fluid pressure around each of said motors when it is desired to reduce the speed of or stop the bypassed motor.

5. In a brake control system for use with several loaded members, the combination as set forth in claim 4 further characterized in that each of said pumps is provided with a pressure relief valve to relieve abnormal pressure on the pump.

6. In a brake control system for use with loaded wheels such as the bull wheels used in cable tensioning apparatus, the combination comprising a first hydraulic brake associated with a loaded wheel which is adapted to be driven by the load placed thereon, a second hydraulic brake associated with a second loaded wheel which is also adapted to be driven by the load thereon, a first hydraulic pump and means connecting said first pump to said first wheel, a second hydraulic pump and means connecting said second pump to said second wheel, a hydraulic line connected between said first hydraulic pump and said first brake and a hydraulic line connected between said second hydraulic pump and said second brake whereby hydraulic pressure is applied to said first and said second brakes from said first and said second pumps, respectively, when said wheels are rotated, a first and a second hydraulic motor, said first motor being connected to said hydraulic line of said first hydraulic pump and said second hydraulic motor being connected to said second hydraulic line of said second hydraulic pump, a third hydraulic line connected to said first and said second motors and to an oil tank, and mechanical means interconnecting said first and said second hydraulic motors whereby when one of said motors is driven by hydraulic pressure applied thereto, it drives the other of said motors and the other of said motors causes hydraulic pressure on the brake associated therewith to drop so that the wheel associated with the latter brake is allowed to rotate and drive the pump associated therewith.

References Cited

UNITED STATES PATENTS 3,004,801    10/1961    Wrigley _____ 303—21
3,250,575    5/1966    Shilton _____ 303—2

DUANE A. REGER, *Primary Examiner.*

U.S. Cl. X.R.

303—2